Patented Jan. 26, 1954

2,667,509

UNITED STATES PATENT OFFICE 2,667,509

AROMATIC THIOSEMICARBAZONES

Hans Schmidt, Wuppertal-Vohwinkel, and Robert Behnisch and Fritz Mietzsch, Wuppertal-Elberfeld, Germany, assignors to Schenley Industries, Inc., New York, N. Y., a corporation of Delaware No Drawing. Application August 8, 1951,
Serial No. 240,978

6 Claims. (Cl. 260—552)

This invention relates generally to novel chemo-therapeutic agents and more particularly it is concerned with certain novel substituted benzalthiosemicarbazones useful in the treatment of tuberculosis.

It is known that benzalthiosemicarbazones having one or more alkoxy groups substituted on the benzal moiety are active against tuberculosis bacilli. It is now found, unexpectedly, that alkenyloxy and alkynyloxy substituted benzalthiosemicarbazones are not merely active against the tuberculosis bacilli but have a disproportionately high activity against these organisms. These compounds of the present invention are benzalthiosemicarbazones having, as substituents in the ortho, meta or para positions of the benzal moiety, alkenyloxy or alkynyloxy groups, having at most four carbon atoms. The invention also includes an alpha-omega-bis-oxy-benzalthiosemicarbazido-alkenylene wherein the alkenylene group is symmetrical with respect to the double bond. These compounds, in addition to being valuable chemo-therapeutic agents because of their tuberculostatic properties, also possess anti-inflammatory activity and are potent agents for use in the treatment of leprosy.

The compounds of this invention can be readily prepared by reacting an alkenyl or alkynyl halide with a hydroxy benzaldehyde, wherein the hydroxy group may be in any of the three positions at choice, whereby an alkenyloxy or alkynyloxy substituted benzaldehyde is obtained that can be reacted with thiosemicarbazide to obtain the desired final product. If desired, the same final products may be obtained by treatment of functional derivatives of the corresponding aldehydes, such as the aldehyde oximes or hydrazones.

This application is a continuation-in-part of co-pending application Serial No. 117,946, filed September 26, 1949, now abandoned, by the same inventors and entitled "Thiosemicarbazones."

To facilitate a better understanding of the subject matter of this invention and the details of procedure whereby the products of the invention may be produced, certain examples herewith follow wherein the preparation of specific compounds is described but it is clearly to be understood that these examples are provided by way of illustration merely, and are not to be construed as imposing limitations upon the scope of the invention defined by the subjoined claims.

Example 1

Approximately 162 g. of 4-allyloxy-benzaldehyde and 91 g. of thiosemicarbazide are refluxed in three liters of ethanol to which a few drops of glacial acetic acid have been added. The solid material is gradually dissolved and the boiling is continued for several hours thereafter. On cooling, 4-allyloxy-benzalthiosemicarbazone separates as nearly colorless crystals in a good yield. These crystals, which have a melting point of 160° C., are insoluble in water, but are soluble in hot ethanol and in hot 2 N caustic soda solution. On adding lead acetate to an aqueous caustic soda solution of the crystals and boiling said solution, a precipitate forms which gradually becomes grey.

Example 2

About 20.2 g. of 3-allyl-4-allyloxy-benzaldehyde and 9.1 g. of thiosemicarbazide are refluxed for several hours in 250 cc. of ethanol to which a few drops of glacial acetic acid have been added. On cooling, colorless crystals of 3-allyl-4-allyloxy-benzalthiosemicarbazone separate from the clear solution. This product melts at approximately 169° C. and is insoluble in water but soluble in hot ethanol.

Example 3

Approximately 17.6 g. of 4-crotyloxy-benzaldehyde (which may be obtained by heating 4-hydroxy-benzaldehyde with crotyl bromide and potassium carbonate; its boiling point at a pressure of 4 mm. of mercury is 135–137° C.) are refluxed for several hours with 9.1 g. of thiosemicarbazide in about 300 cc. of ethanol to which a few drops of glacial acetic acid have been added. At first the solution is clear, but later the reaction product crystallizes from the hot reaction mixture. The 4-crotyloxy-benzalthiosemicarbazone is recovered and after being dried, is obtained as a colorless, crystalline powder, melting at about 195° C., which is insoluble in water but soluble in hot ethanol.

Example 4

About 162 g. of 3-allyloxy-benzaldehyde (which may be obtained by heating 3-hydroxybenzaldehyde with allyl bromide and potassium carbonate in ethanol solution; its boiling point at a pressure of 13 mm. of mercury is 131–134° C.) are refluxed in 1.2 liters of ethanol with 91 g. of thiosemicarbazide. When the reaction has stopped, 3-allyloxy-benzalthiosemicarbazone may be recovered therefrom in good yield as a colorless powder, having a melting point of 147° C. which is insoluble in water but soluble in hot ethanol. It also may be dissolved by heating in a 2 N sodium hydroxide solution, and, upon addition of some lead acetate to this solution, followed by boiling, a precipitate is obtained which gradually becomes grey.

Example 5

Approximately 17.6 g. of 3-crotyloxybenzaldehyde (which may be obtained by heating 3-hydroxybenzaldehyde with crotyl bromide and potassium carbonate in ethanol solution; its boiling point at a pressure of 4 mm. of mercury is 120–121° C.) are refluxed for several hours with 9.1 g. of thiosemicarbazide in 300 cc. of ethanol, to which a few drops of glacial acetic acid, advantageously has been added. The 3-crotyloxy-benzalthiosemicarbazone, which crystallizes on cooling the reaction mixture, is recovered, dried and is thus obtained as a colorless, crystalline powder, melting at 152° C., which is insoluble in water but which is soluble in hot ethanol.

Example 6

About 20.6 g. of 1:4-bis(4'-formyl-phenoxy)-sym-butenylene, represented by the formula:

OHC—⟨⟩—O—CH$_2$—CH=CH—CH$_2$—O—⟨⟩—CHO (which may be obtained by heating one mol of 1:4-dibromobutene with two mols of 4-hydroxy-benzaldehyde and potassium hydroxide in dry ethanol, and which has the melting point of 148° C.) are refluxed for two days with 18 g. of thiosemicarbazide in 1 liter of ethanol and 400 cc. of glacial acetic acid. The precipitate, which is removed and washed with ethanol, is sym-butenylene - 1:4-bis(4'-oxybenzalthiosemicarbazone), which may be represented by the formula:

$$\begin{array}{c}\text{CH} \\ \| \\ \text{N} \\ | \\ \text{NH} \\ | \\ \text{C=S} \\ | \\ \text{NH}_2\end{array}-\langle\rangle-\text{O-CH}_2\text{-CH=CH-CH}_2\text{-O}-\langle\rangle-\begin{array}{c}\text{CH} \\ \| \\ \text{N} \\ | \\ \text{NH} \\ | \\ \text{C=S} \\ | \\ \text{NH}_2\end{array}$$

It is a weakly colored, water-insoluble powder, melting above 270° C. with decomposition.

Example 7

Approximately 32 g. of 4-propargyloxy-benzaldehyde, which may be obtained by heating propargyl bromide with p-hydroxybenzaldehyde and potassium hydroxide in dry ethanol, M. P. 85° C., are refluxed with 18.2 g. of thiosemicarbazide in 250 cc. of ethanol. After the reaction is completed, the mixture is cooled and the crystals which have precipitated are recovered. They have a melting point of about 191° C.

Having thus described the subject matter of this invention, what it is desired to secure by Letters Patent is:

1. As a novel chemotherapeutic agent a member of the class consisting of compounds having one of the formulae A.
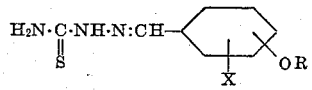

and

B.
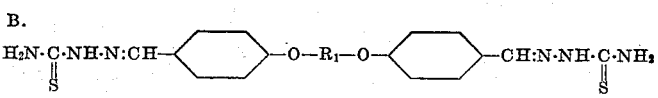

wherein R is a member of the group consisting of the alkenyl and alkynyl radicals containing at most 4 carbon atoms; X is a member of the group consisting of hydrogen and alkenyl of 3 carbon atoms; and R$_1$ is the alkenylene radical of 4 carbon atoms.

2. A chemotherapeutic agent as defined in claim 1, Formula A, wherein the OR substituent is allyloxy in the para position and the X is hydrogen.

3. A chemotherapeutic agent as defined in claim 1, Formula A, wherein the OR substituent is crotyloxy in the para position and the X is hydrogen.

4. A chemotherapeutic agent as defined in claim 1, Formula A, wherein the OR substituent is allyloxy in the meta position and the X is hydrogen.

5. A chemotherapeutic agent as defined in claim 1, Formula A, wherein the OR substituent is propargyloxy in the para position and the X is hydrogen.

6. A chemotherapeutic agent as defined in claim 1, Formula B, wherein the —R$_1$—radical is the butenylene radical, —CH$_2$—CH:CH—CH$_2$—.

HANS SCHMIDT.
ROBERT BEHNISCH.
FRITZ MIETZSCH.

References Cited in the file of this patent

FOREIGN PATENTS

| Number | Country | Date |
|---|---|---|
| 809,810 | Germany | Aug. 2, 1951 |
| 998,050 | France | Sept. 19, 1951 |
| 1,000,023 | France | Oct. 10, 1951 |

OTHER REFERENCES

Bernstein et al., "J. Am. Chem. Soc.," vol. 73, March 1951, p. 907.